(12) United States Patent
Avaro et al.

(10) Patent No.: US 6,262,409 B1
(45) Date of Patent: Jul. 17, 2001

(54) METHOD FOR THE DETECTION OF THE RELATIVE DEPTH OF OBJECTS IN AN IMAGE FROM A PAIR OF IMAGES

(75) Inventors: Olivier Avaro, Paris; Lothar Bergen, Fontainebleau; Fernand Meyer, Veneux les Sablons, all of (FR)

(73) Assignee: France Telecom, Paris (FR)

( * ) Notice: Subject to any disclaimer, the term of this patent is extended or adjusted under 35 U.S.C. 154(b) by 0 days.

(21) Appl. No.: 09/320,147

(22) Filed: May 26, 1999

(30) Foreign Application Priority Data

May 27, 1998 (FR) .................................................. 98 06685

(51) Int. Cl.$^7$ .................................................. H01L 27/00
(52) U.S. Cl. .................................. 250/208.1; 250/559.27
(58) Field of Search ........................... 250/208.1, 559.29, 250/559.32, 559.24, 559.26, 559.27; 348/699–701; 382/173, 174, 195, 193, 205; 359/554

(56) References Cited

U.S. PATENT DOCUMENTS 5,929,940 * 7/1999 Jeanmin ................................. 348/699

OTHER PUBLICATIONS

Thompson et al., Dynamic Occlusion Analysis in Optical Flow Fields, IEEE Transactions on Pattern Analysis and Machine Intelligence, Jul. 1985, pp. 374–383 (D14).
Zhang, Parameter Estimation Techniques: A Tutorial With Application to Conic Fitting, Technical Report No. 2676, Oct. 1995 (D15).
Black et al., Estimating Optical Flow in Segmented Images Using Variable–Order Parametric Models With Local Deformations, Pattern Analysis and Machine Intelligence, vol. 18, No. 10, Oct. 1996, pp. 972–986 (D17).
Bergen et al., Segmentation of the Motion of the Objects in a Scene, Mar. 1997 (D18).
Beucher, *Segmenttion d'Images et Morphologie Mathematique*,Phd Thesis, E.N.S. des Mines de Paris, 1990 (D1 Abstract) (Month Unknown).
Wolberg, Digital Image Warping, IEEE Computer Press, 1990 (D10) (Month Unknown).
Darrel et al., Second–Order Method for Occlusion Relationships in Motion Layers, Technical Report 1995 (D12) (Month Unknown).
Chauvet, Aide Memoire de Geostatique Lineaire, Ecole des Mines de Paris, 1993 (D16) (Month Unknown).
Wang et al., Representing Moving Images With Layers, The IEEE Transactions on Image Processing Special Issue; vol. 3, No. 5, Sep. 1994, pp. 625–638 (D9).
Cichosz et al., Morphological Multiscale Image Segmentation, Workshop on Image Analysis for Multimedia Interactive Services, Jun. 1997, pp. 161–166 (D11).
Horn et al., Determining Optical Flow, Artificial Intelligence, 1993, pp. 81–87 (D13) (Month Unknown).

(List continued on next page.)

*Primary Examiner*—Que T. Le
(74) *Attorney, Agent, or Firm*—Nilles & Nilles SC

(57) ABSTRACT

Disclosed is a method for the detection of the relative depth of two neighboring regions in relative motion with respect to each other in two images obtained from different shots of a scene, in order to know the composition of the scene. The method consists in carrying out a spatial segmentation of one of the images, called a reference image; a local estimation of the motion between the two images, the resultant vector field of which is called local motion; a determining of the motion estimation errors along the motion boundaries; and an analysis of the localization of the motion estimation errors along the motion boundaries to conclude that a region A is in front of a region B when the motion estimation error along the boundary is chiefly localized on the side B of this boundary.

19 Claims, 7 Drawing Sheets

OTHER PUBLICATIONS

Huber, Robust Statistics, John Wiley, 1981 (D6) (Month Unknown).

Meer et al., Robust Regression Methods for Computer Vision: A Review, International Journal of Computer Vision, 6(1), Apr. 1991, pp. 59–70 (D7).

Pal et al., A Review on Image Segmentation Techniques, Pattern Recognition, vol. 26, No. 9, 1993, pp. 1277–1294 (D8) (Month Unknown).

Tirumalai et al., Dynamic Stereo With Self–Calibration, Dec. 1992, vol. 14, No. 12, pp. 1184–1189.

Chang et al., Depth From Stereo Image Flow, Nov. 1989, vol. 2, pp. 586–591.

Barron et al., Performance of Optical Flow Techniques, International Journal of Computer Vision, 1994, pp. 43–77. (D2) (Month Unknown).

Bergen et al., Motion Segmentation and Depth Ordering Basedon Morphological Segmentation, Jun. 1998, vol. 2, pp. 531–547.

Tistarelli et al., Dynamic Stereo in Visual Navigation, Jun. 1991, pp. 186–193.

Thompson et al., Dynamic Occlusion Analysis in Optical Flow Fields, Jul. 1985, pp. 374–383.

Mutch et al., Analysis of Accretion and Deletion at Boundaries in Dynamic Scenes, IEEE Transactions on Pattern Analysis and Machine Inteligence, vol. PAMI–7, No. 2, Mar. 1985, pp. 133–138 (D3).

Decenciere et al., Applications of Kriging to Image Sequence Coding, Image Communication, 1997, pp. 227–249 (D4) (Month Unknown).

Hampel et al., Robust Statistics—The Approach Based on Influence Function, Wiley, 1986 (D5) (Month Unknown).

* cited by examiner

METHOD FOR THE DETECTION OF THE RELATIVE DEPTH OF OBJECTS IN AN IMAGE FROM A PAIR OF IMAGES

BACKGROUND OF THE INVENTION

1. Field of the Invention

The invention relates to a method for the detection of the relative depth of objects in an image from a pair of images.

The general context of the invention is the estimation of the relative depths of objects seen in images coming from different shots whether these images are taken successively in time or from different angles.

This method is part of the framework of various applications requiring a semantic analysis of image sequences. In particular, in the field of multimedia, the growing quantity of audiovisual data is creating the need for new functions such as the interactivity and the integration of objects of different kinds. The new MPEG-4 standard makes it possible to show a scene as a composition of objects but it does not specify the way in which the scene is analyzed.

2. Description of the Prior Art

The current techniques relevant to the framework of this invention study the zones of occlusion that appear in a sequence of images. These techniques are described in an exemplary occlusion in the next paragraph.

FIG. 1 shows an exemplary situation giving rise to the occlusion. A sensor, herein represented by an eye, sees two objects A and B: one object B that moves leftward covers a second object A that moves rightward.

When the motion, namely the shifting of the objects with respect to each other, is observed, it becomes clear that, in a certain number of situations, one object passes in front of another.

The relative depth of an object with respect to another is the depth with respect to the view that an observer might have along the line that goes from the observer's eye and crosses the objects of the scene.

Along this axis, there are objects that are in different planes.

In fact, it is not sought here to assess the depth itself but to know which object is in the front with respect to another object of the scene. This information is necessary for a certain number of applications, especially for encoding when it is sought to carry out image prediction. This information makes it possible for example to reconstruct the background of an image.

Indeed, with the relative depth being known, it is possible to define the background of an image and, as the case may be, a) neutralize this background or b) make it fuzzy or c) replace it by another or d) compress the information with very few bits and concentrate the essential part of the information on the part that is in front.

The detection of the relative depth between objects is therefore aimed at providing a better understanding of the observed scene.

When the manner in which the objects move is observed, and when it is seen that they are behind other objects that do not move or have a motion is proper to them, it is thus possible to define the organization of the scene without introducing any semantic knowledge, i.e. without being capable of recognizing the type of object that is in the scene.

It is known simply that this is a set of components that are homogeneous in color and in texture, namely homogeneous zones that are related to one another because they have the same motion. The homogeneous zones are assembled in entities that have is motions proper to themselves.

By observing the motion boundaries between the different entities, it can be deduced therefrom that the entity E1 is locally in front of the entity E2 which is itself in front of the entity E3.

By integrating these information elements in time through images successively, it is possible to obtain a relatively deep structure.

There is therefore need to study the relative depth of the regions to detect their motion boundaries. In the prior art, these boundaries are obtained by means of a motion segmentation.

It may be recalled that image segmentation is a known technique consisting of the conversion of a set of pixels into a mosaic image where each particle related to the mosaic has a homogeneity of color of texture (namely luminance) or of motion or a combination of several criteria. In the case of motion segmentation, each mosaic has a homogeneity of motion.

Now, to study the shifting of a motion boundary, it is necessary to take account of three images of the scene by way of input information.

Indeed, the existing techniques seek to detect the motion boundaries and then compare the motion of these boundaries with the motion of the adjacent regions in order reach a conclusion. Now, to estimate the motion, it is necessary to analyze two successive images and, estimate the motion of the boundary, it is necessary to have two successive positions of the boundary, giving three images to be analyzed.

This technique is given in detail here below with reference to FIGS. 2A and 2B.

By analyzing two consecutive images I1, I2 of a sequence, it is possible to estimate the motion of the scene. This motion may be used to segment the scene into objects A, B whose motions are independent. FIG. 2A shows the motion of the two objects A, B as well as the segmentation.

This motion segmentation does not contain sufficient information to deduce the relative depth of the two objects. The analysis of the motion of a second pair of images $I_2$ and $I_3$ gives the missing information: the two types of segmentation enable the estimation of the motion of the contour (or boundary) between the two objects.

The comparison of the motion of the contour (boundary) with the motion of the texture (luminance) of the two sides enables the relative depth to be deduced: the region that has the same motion as the contour corresponds to the occluding object. In this example, the two successive segmentations of the motion, shown in FIGS. 2A and 2B, indicate that the contour moves leftward. Since the motion is identical to the motion of the right-hand region, it is concluded therefrom that the object to the right is occluding the object to the left.

In the literature, there are different approaches that make use of this fact. Thompson, Mutch and Berzins (ref. D14 hereinafter) use the pairing of characteristic points to obtain a sparse field of speed that explains the motion between two images. Then they detect discontinuities in this field of speed. The analysis of two fields of speed (computed from two pairs of images) enables them to deduce the relative depth.

A second approach is described by Darrell and Fleet (ref. D12 hereinafter). This approach segments the scene into planes with a coherent motion using exclusively the motion information. The progress of these planes makes it possible to determine the motion of the contours which in turn enable the estimation of the relative depth.

Reference may also be made to the prior art constituted by the documents D1–D18 cited here below for the techniques described and commonly used for image processing: D1: S. Beucher. Segmentation d'Images et Morphologie Mathematique (Image Segmentation and Mathematical Morphology), Phd thesis, E.N.S. des Mines de Paris, 1990. D2: J. Barron, D. Fleet and S. Beauchemin. Performance of Optical Flow Techniques. International Journal of Computer Vision, 12(1): 43–77, 1994. D3: K. M. Mutch and W. B. Thompson. Analysis of Accretion and Deletion at Boundaries in Dynamic Scenes. IEEE Transactions on Pattern Analysis and Machine Intelligence, 7: 133–138, 1985. D4: E. Decenciere Ferrandiere, C. de Fouquet and F. Meyer. Applications of Kriging to Image Sequence Coding. Accepted for publication in Signal Processing: Image Communication, 1997. D5: F. Hampel, E. Ronchetti P. Rousseeuw, and W. Stahel. Robust Statistics—The Approach Based on Influence Function. Wiley, 1986. D6: P. Huber. Robust Statistics. John Wiley, New York, 1981. D7: Peter Meer, Doron Mintz, Dong Yoon Kim, and Azriel Rosenfeld. Robust Regression Methods for Computer Vision. A Review. International Journal of Computer Vision, 6(1): 59–70, April 1991. D8: Nikhil R. Pal and Sankar K. Pal. A Review on Image Segmentation Techniques. PatternRecognition, 26(9): 1277–1294,1993. D9: J. Y. A. Wang and E. H. Adelson. Representing Moving Images with Layers. The IEEE Transactions on Image Processing Special Issue: Image Sequence Compression, 3(5): 625–638, September 1994. D10: G. Wolberg. Digital Image Warping. IEEE Computer Press, 1990. D11: J. Cichosz and F. Meyer. Morphological Multiscale Image Segmentation. In Workshop on Image Analysis for Multimedia Interactive Services (WIAMIS'97), pages 161–166, Louvain-la-Neuve (Belgium), June 1997. D12: Trevor Darrel and David Fleet. Second-Order Method for Occlusion Relationships in Motion Layers. Technical Report 314, MIT Media Lab Vismod, 1995. D13: B. K. P. Horn and B. G. Schunck. Determining Optical Flow. Artificial Intelligence, 17: 185–203, 1981. D14: W. B. Thompson, K. M. Mutch, and V. A. Berzins. Dynamic Occlusion Analysis in Optical Flow Fields. IEEE Transactions on Pattern Analysis and Machine Intelligence, 7: 374–383, 1985. D15: Zhengyou Zhang. Parameter Estimation Techniques: A Tutorial with Application to Conic Fitting. Technical Report 2676, Institute National de Recherche en Informatique et en Automatique, Sophia-Antipolis Cedex, France, October 1995. D16: P. Chauvet Aide Memoire de geostatique lineaire. Ecole des Mines de Paris, 1993. D17: Michael J. Black and Allan D. Jepson. Estimating Optical Flow in Segmented Images Using Variable-Order Parametric Models With Local Deformations. IEEE Trans. Pattern Analysis and Machine Intelligence, 18(10): 972–986, October 1996. D18: L. Bergen and F. Meyer. Segmentation du mouvement des objets dans une scene (Segmentation of the Motion of the Objects in a Scene). In Coresa 97, 1997.

The drawbacks of the techniques presented in the above paragraph (documents D12, D14) are the following:

These techniques are based entirely on motion leading to an imprecise localization of the motion boundaries.

These techniques use three images (two motion segmentations) to determine the motion of the contours; the problems of lack of precision in the localizing of the boundaries spread over into the estimation of the motion of the contours and therefore in the detection of the depth. Furthermore, this leads to an additional delay in analysis.

Furthermore, the field of application of these techniques is restricted to cases where the motion is relatively great.

SUMMARY OF THE INVENTION

The aim of the invention is the detection of the relative depth between objects from a pair of images by means of a method that does not have the drawbacks of the prior art.

To this end, an object of the invention is a method which, using a pair of images taken from different shots of the same scene, is capable of detecting the motion boundaries very precisely and of specifying, for each boundary, the relative depth of each adjacent region.

Hereinafter, the term "motion of a point" will be understood to mean the shifting of this point in passing from one image to another, these images being derived from different shots of a scene whether the shots are successive in time or are simultaneous but with a different angle for example.

An object of the invention therefore is more particularly a method for the detection of the relative depth of two neighboring regions in relative motion with respect to each other in two images obtained from different shots of a scene, wherein the method chiefly comprises the following steps:

a spatial segmentation of one of the images, called a reference image, a local estimation of the motion between the two images, the resultant vector field of which is called local motion, a determining of the motion estimation errors along the motion boundaries, and an analysis of the localization of the motion estimation errors along the motion boundaries to conclude that a region A is in front of a region B when the motion estimation error along the boundary is chiefly localized on the side B of this boundary.

According to another characteristic, after the first two steps of the method, a step of fusion of the regions will be carried out to obtain regions of homogeneous motion.

Preferably, the spatial segmentation will be done according to a morphological method and more particularly according to the method based on the watershed transform.

Other characteristics of the present invention relate to different embodiments to determine motion estimation errors along the motion boundaries.

BRIEF DESCRIPTION OF THE DRAWINGS

Other features and advantages of the invention shall appear from the following description given by way of a non-restrictive example and made with reference to the appended drawings, of which.

MORE DETAILED DESCRIPTION

The method according to the invention can be implemented by means of a program loaded into a microcomputer in order to implement the different steps that shall be described hereinafter or by means of an electronic device designed for this purpose.

The microcomputer (not shown) could be connected to one or two cameras making it possible to obtain two different shots of the scene U, W that are used as input data in the processing sequence that follows and take the form of matrices of pixels after digitization.

It is of course possible instead to have audiovisual equipment with a processing unit and pre-recorded images.

For a clearer understanding of the rest of the invention, reference will be made to FIGS. 3A–3C and 4 and 5A, 5B.

Figure 1:
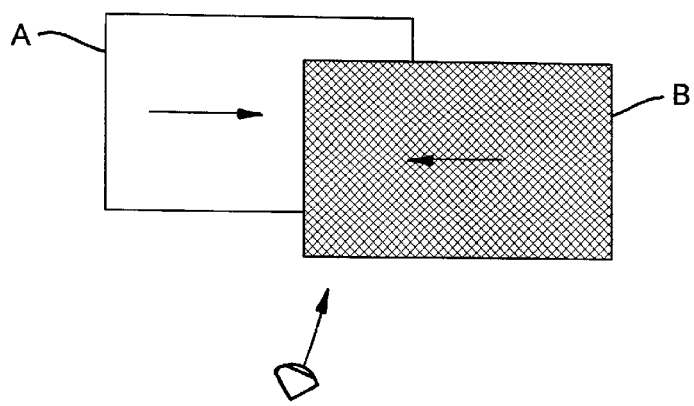
FIG. 1 gives a diagrammatic view of the occlusion phenomenon.
Figure 2A:
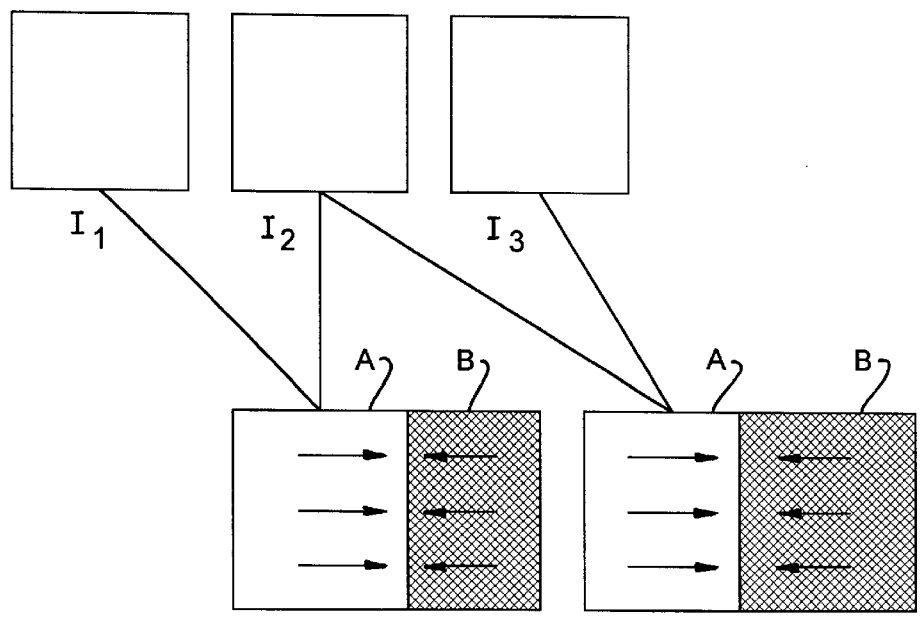
FIGS. 2A to 2B provide a diagrammatic view of the image-processing steps of the prior art.
Figure 2B:
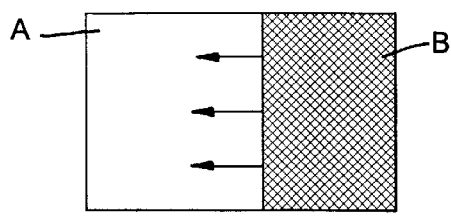
Figure 3A:
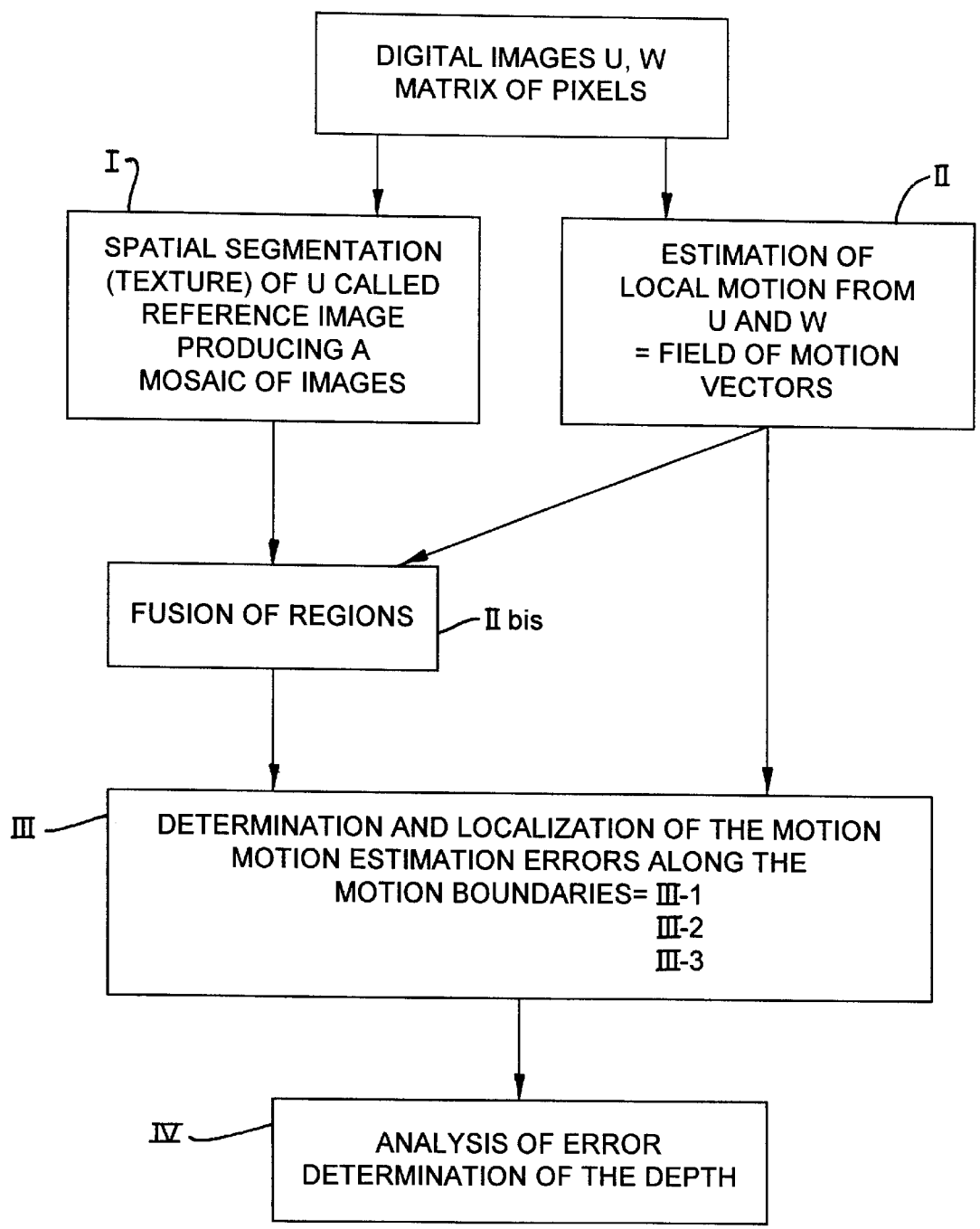
FIGS. 3A to 3C provide a diagrammatic illustration of the image processing steps according to the method of the invention.

FIG. 3A illustrates the sequence of processing operations.

Figure 4:
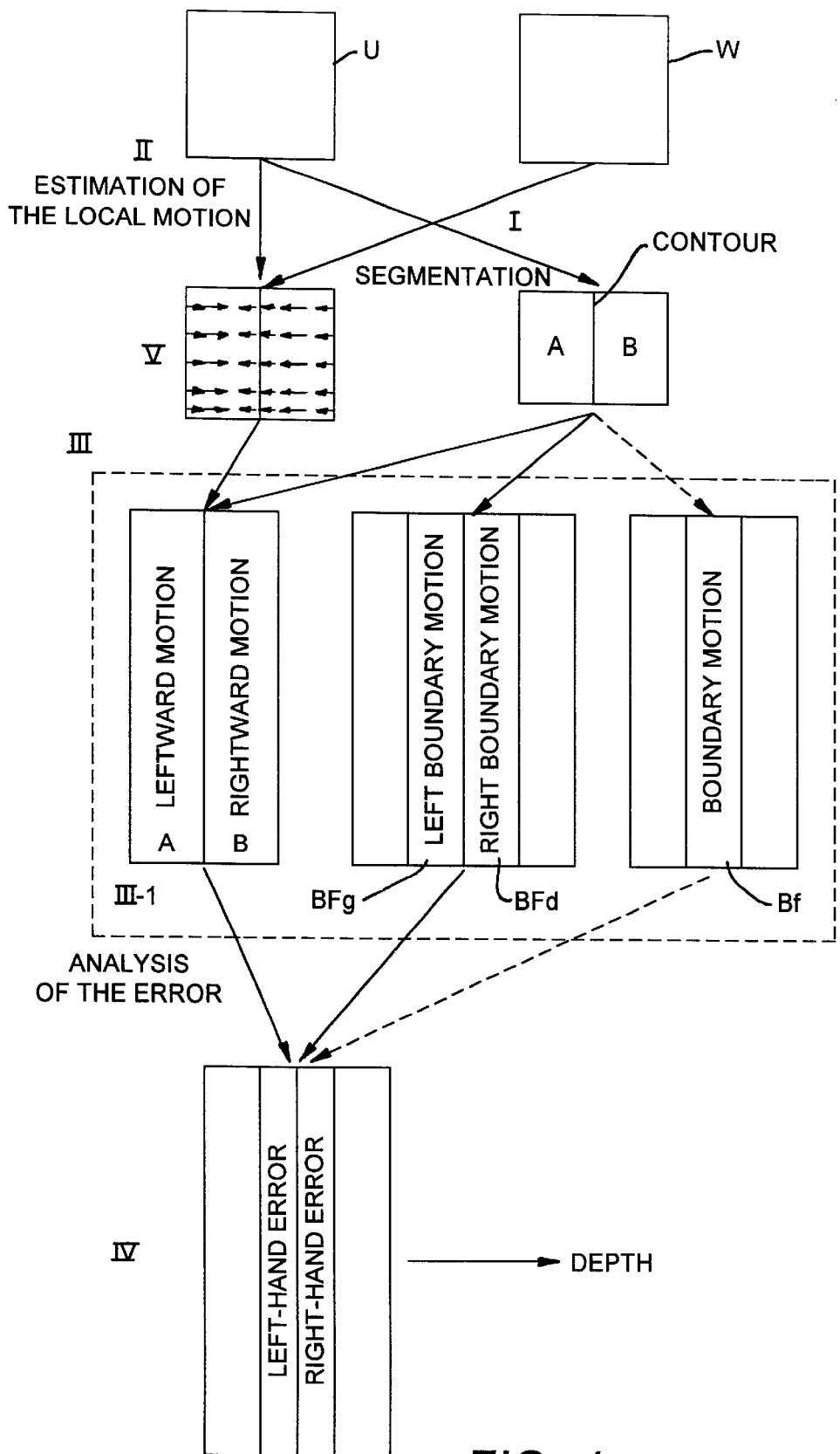
FIG. 4 provides diagrammatic views of images resulting from the different processing steps according to the invention.
Figure 5A:
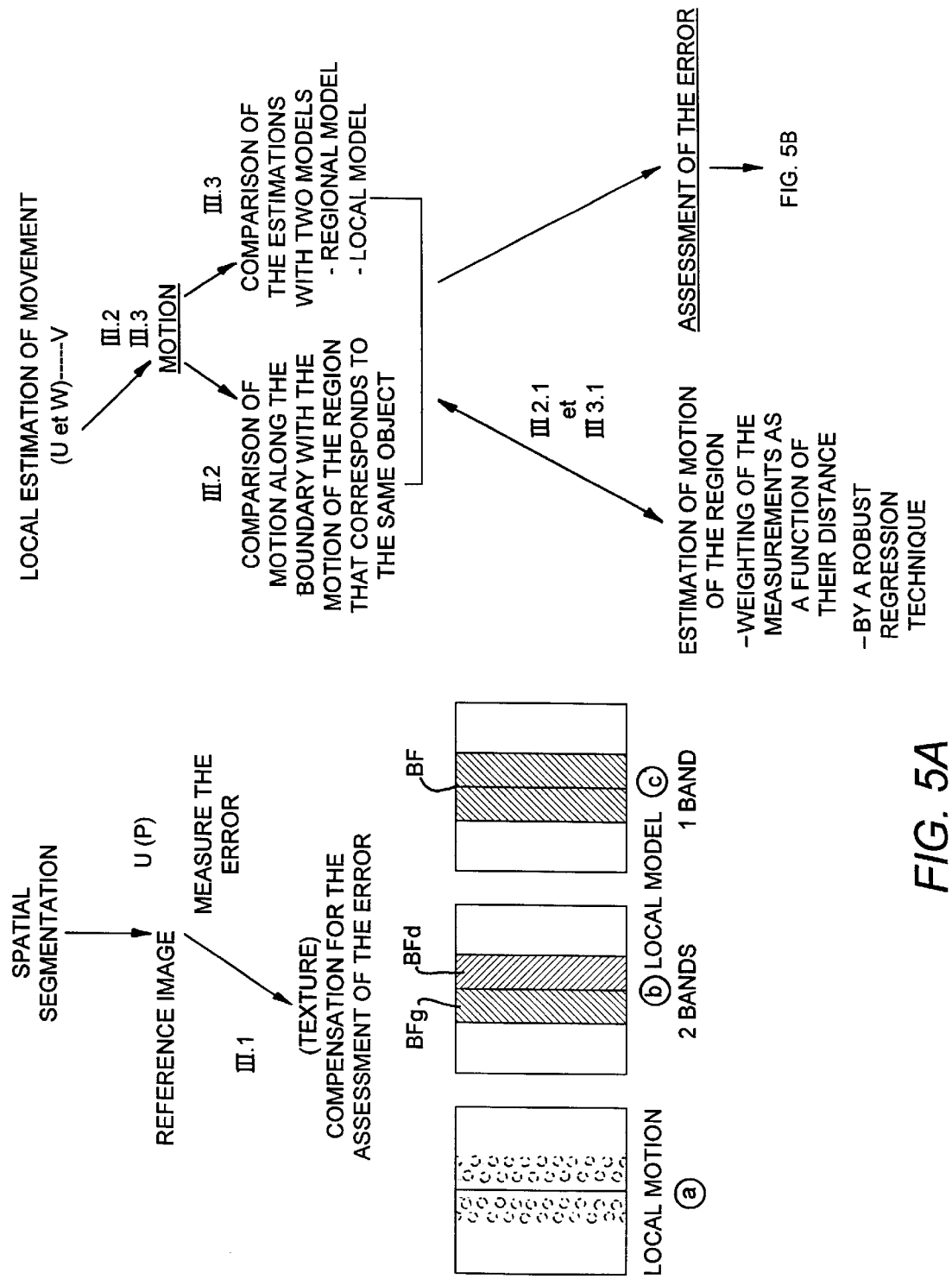
FIGS. 5A and 5B illustrate different alternative embodiments to assess the motion estimation error along the motion boundaries.
Figure 5B:
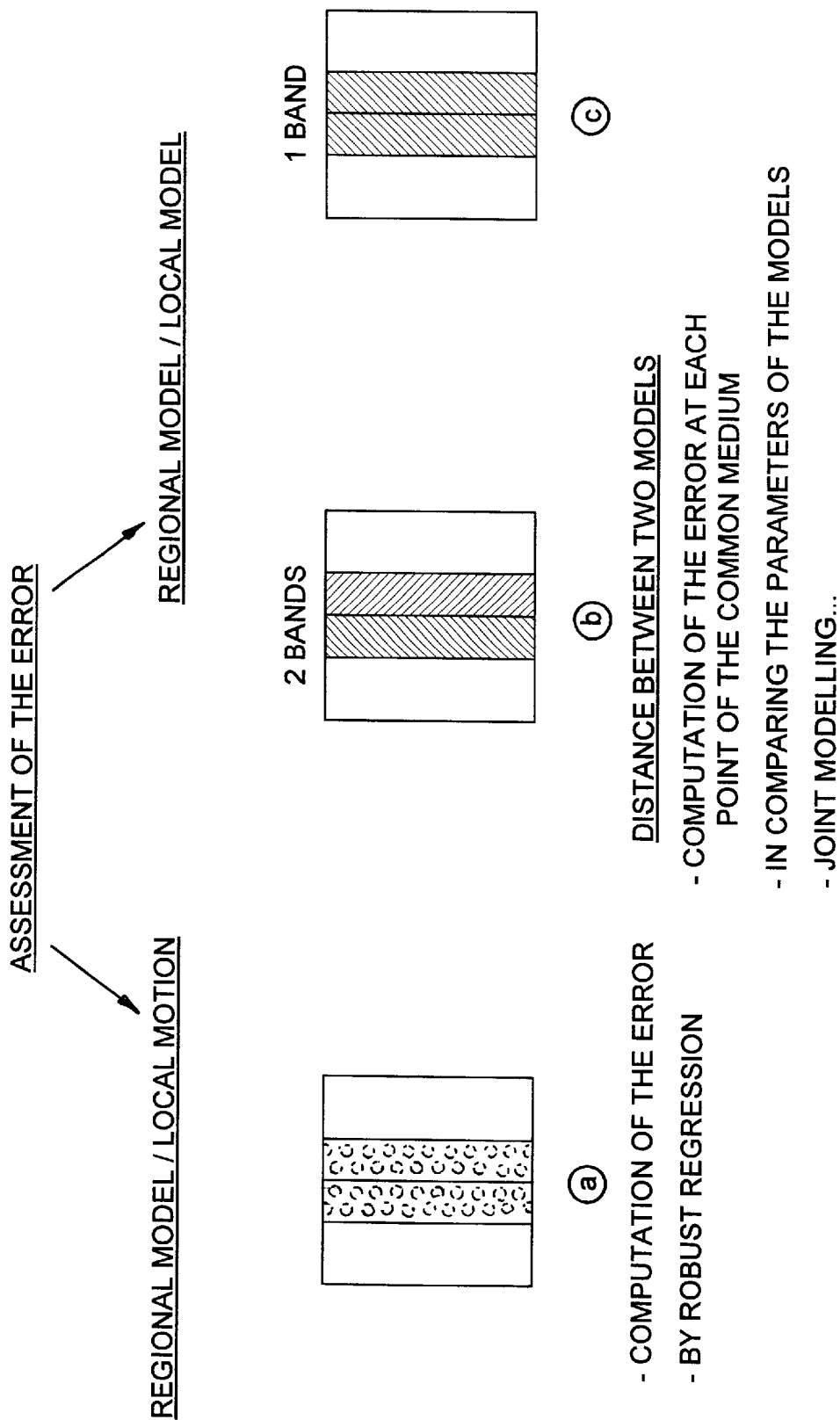

This sequence has two parallel processing sets, of which one I enables the obtaining of a spatial segmentation of one of the images, for example the image U, which shall hereinafter be considered to be the reference image while the other set II enables the obtaining of a motion estimation in each pixel. This is a local estimation of the motion between the two images U, W whose resultant vector field is called the local motion (FIG. 4).

At output of these processing operations, there is obtained a partition P of the image from the spatial segmentation and a field V of motion vectors explaining the motion of each image point or picture element (pixel) from the motion estimation.

In each region of the spatial segmentation, a motion model is adjusted, providing the clearest possible explanation of the total motion of the region. This is described in detail hereinafter.

Then a step is carried out for fusing those regions obtained by the spatial segmentation that have similar motions (step IIa). This makes it possible to bring out the motion boundaries.

Since the local motion estimation produces a wrong estimation along the motion boundary, it is then sought to determine the estimation error in order to localize and thus know the side of the occluded region for this error appears only on the occluded region side (step III).

The knowledge of the occluded region leads to the detection of the relative depth of two regions in motion with respect to each another (step IV).

A criterion is needed to determine (or compute the error). A first criterion chosen may be called a "compensation fidelity" criterion, a second chosen criterion may be called a "motion disparity" criterion.

For the "compensation fidelity" criterion, a compensation of motion of the second image (of the texture) is carried out along the field of vectors V in order to construct an estimation of the reference image, and the distribution of the compensation error is studied directly. It is then possible, as in the following operating modes (a, b, c), to find the band (BFg or BFd) in which the error is the greatest.

For the "motion disparity" criterion, a motion model is adjusted within each region of the partition P on the basis of the field of motion vectors V.

Along each motion boundary, an observation band BF is constituted (or according to another variant two bands BFg and BFd are constituted on either side of the boundary).

a) The regional model is compared with the local motion, or b) A motion model is estimated from the field V in the band BF and this motion is compared with that of the adjacent regions. The adjacent region that has the most similar motion is the one found in front of the other, or c) A motion model is estimated on the basis of the field V in the two bands BFg and BFd. The region X for which the estimation in the band BFx and the overall estimation in the region X are most in agreement is the one that is in front of the other.

Figure 3B:
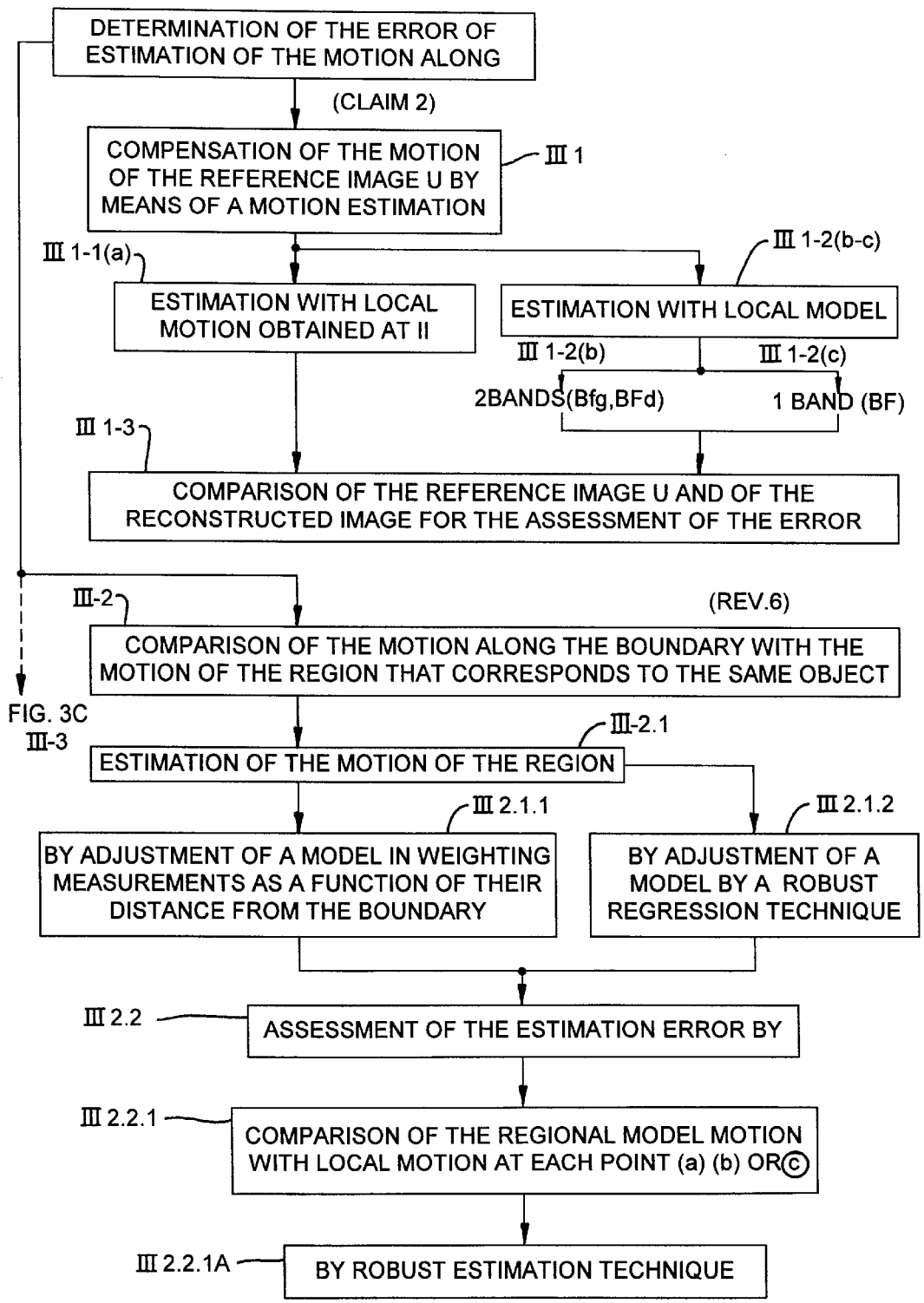
Figure 3C:
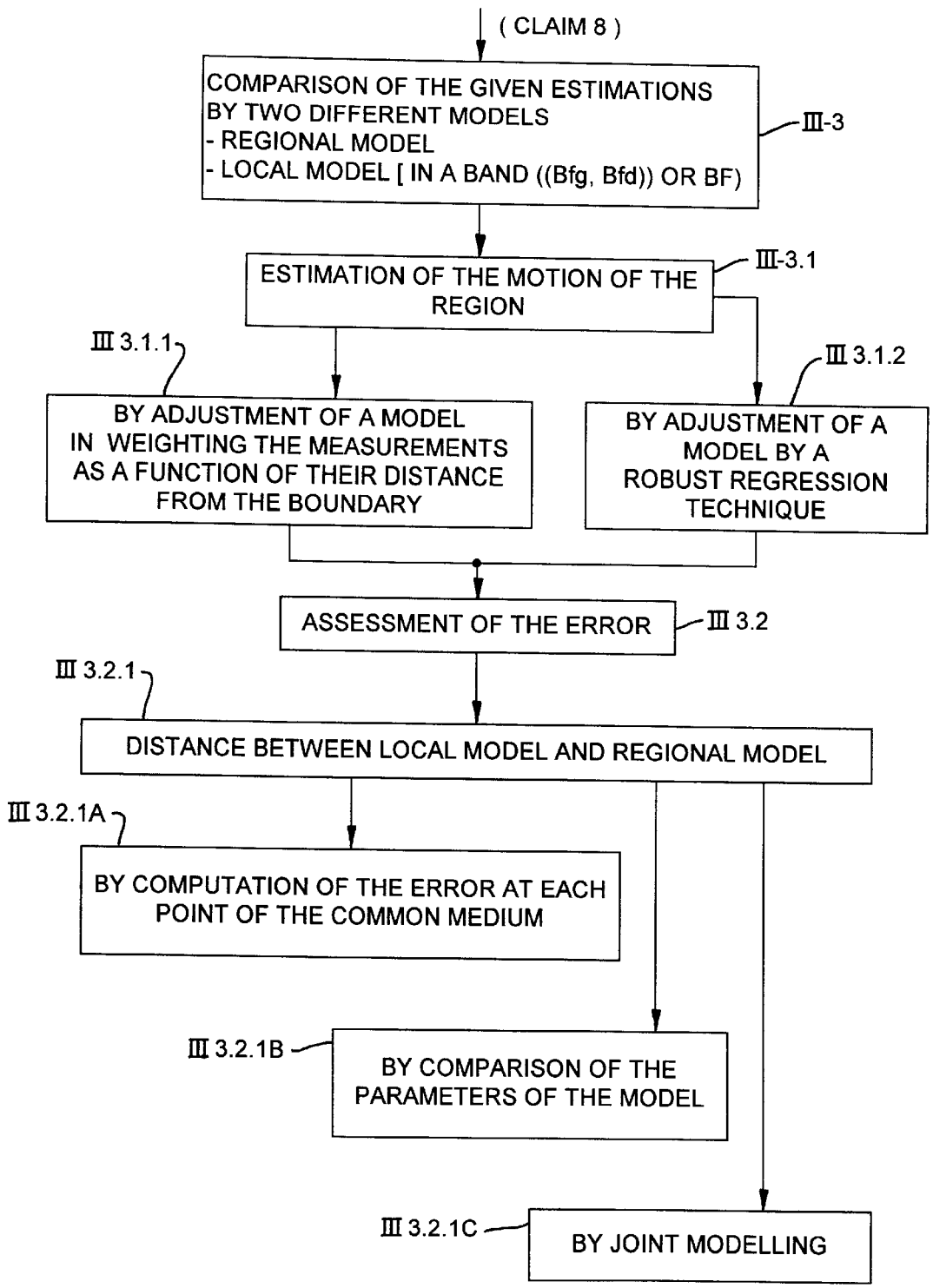

A detailed description shall now be given of each step of the method with reference to FIGS. 3A–3C:

I. The spatial segmentation makes it possible to define the composition of the image by regions that are homogeneous in color and texture in terms of gray levels, independently of any consideration of motion. It is not necessary, for this purpose, to have two input images as in the case of the motion segmentation.

To overcome problems of noise and have sufficient information, the motion inside a window is taken into account. Thus, the motion vector assigned to the center of the window does not represent the motion at this point but the dominant motion inside the window. This gives rise to great imprecision, especially along the motion boundaries.

The boundaries obtained by segmenting the motion by the prior art methods are less precise than the boundaries obtained by segmenting the luminance or the color. This is due to the fact that the field of speed must be estimated at all points whereas the gray levels or the color may be directly seen at each point without preliminary estimation.

The spatial segmentation technique can be used to obtain regions that are homogeneous in texture, for example, as well as their boundaries in a very precise way from an image U.

The method used will preferably be a morphological segmentation method and more particularly a method based on the image gradient and the watershed transform.

II. The motion estimation is achieved by means of a second image W and the first image U.

This method is used to obtain a field of motion vectors V explaining the motion of each pixel. Preferably, the method used will be a differential method that is standard per se to obtain this motion estimation. The two images are prefiltered in order to prepare the differentiation and improve the signal-to-noise ratio.

Since the motion information that can be observed at each pixel is incomplete, for only the speed component normal to the iso-luminance contours is available, this incomplete information of each pixel is integrated through the adjustment of a motion model at each region. It is possible to chose a representation in polynomial form. It is also possible to chose a representation in nodal form. The choice of the number of nodes depends on the complexity of the scene..

A number of fixed nodes is chosen as a function of the complexity of the motion. The modelling is done by assigning each of these nodes the motion which, by interpolation, gives the best possible rendering of the motion observed in each pixel. The technique of interpolation used is a standard technique called kriging (D4, D16). The speed at each point of a region is a linear function of the speeds at the fixed nodes. It is known that a node produces a simple translation, three nodes produce a refined model and a greater number of nodes gives increasingly complex models.

The fusing of regions (step IIa) is done by iteration: at each iteration, all the pairs of neighboring regions are candidates for fusion. Instead of trying to compare the motion in space of the parameters, a new set of parameters is computed for each of the pairs and the quality of the modelling is assessed. This modelling is done by the resolution of an over-determined linear system that is weighted by the weight coming from the initial robust estimation.

The different steps of the fusion of regions are the following:

1) a set criterion of motion similitude is taken, based on the quality of the modelling for all the pairs of regions (for example a maximum value not to be exceeded), 2) the pair of regions having the most similar motion is fused, 3) the criteria of similitude for all the regions affected by the fusion (these are all the pairs of regions that contained one of the fused regions) are updated, 4) the steps are iterated starting from the step 2.

The fusion stops when the criterion of similitude falls below a pre-defined value.

The following step III of the method then consists, as stated here above, in determining (or assessing) the motion estimation error.

Several operating modes are proposed hereinafter to obtain this determination of motion estimation error. These different modes appear in FIGS. 3B and 3C.

A first operating mode relies on the use of a motion compensation method and two others rely on the motion disparity.

The first operating mode III.1 implements the "compensation fidelity" criterion. For this, the motion estimation error is obtained by comparing the reference image P, namely the image obtained by the spatial segmentation, and the image obtained by motion compensation in order to reconstruct an estimation of the reference image from the second image.

The techniques of motion compensation are well-known techniques. Reference could be made for example to the book referenced D10.

According to a first alternative mode of execution, the motion is the local motion (III-1.1 (a)) in FIG. 3B.

According to another alternative mode of execution, the motion is derived from a model called a local model adjusted in a band within the localized region along the boundary between A and B (III.1.2.b and c). In b, two bands BFg, BFd are considered, and in c a single band BF is considered.

It is possible to take only one local model estimated within a band extending on either side of the boundary (III-1.2c).

The model used could be for example a polynomial model. It could also be a nodal model such as the models described in the publication D4.

According to a second operating mode III.2 implementing the criterion of motion disparity, the motion estimation error is computed by comparing the motion coming from the model called a regional model, representing the motion of the region, with the local motion (cf. FIG. 3B).

The error computation will be done preferably by means of a robust estimation technique.

The use of a robust estimation technique (M-estimators) is known and a technique of this kind is described in the documents, for example D5, D6 and D7.

It may be recalled however that the robust estimation techniques applied to the estimation of parameters of a motion model enable the detection of the aberrant motion vectors and the elimination or reduction of their influence in the estimation: parameters are obtained that correspond to the majority of the speed vectors observed. The robust techniques also give the modelling error at each point of the medium of the model.

A third operating mode III.3 implementing the motion disparity criterion consists in determining the motion estimation error in each region by comparing the motion estimations given by two different models:

one model representing the motion of the region, called a regional model, and one model representing the model of a band within the localized region along the boundary between A and B, called a local model.

The regional model could for example be a polynomial or nodal model. Examples of such models are given for example respectively in the publication D17 and in the publication D4.

The local model could for example be polynomial or nodal. Similarly, these models could for example of the kind published respectively in the publication D17 and in the document D4.

According to one variation of execution, a single local model is estimated within a band extending on either side of the boundary.

According to the last two operating modes that have been described, the motion of the region could be computed by the adjustment of the model in weighting the measurements as a function of their distance from the boundary between A and B (III.2.1.1 or III.3.1.1).

One possibility consists in excluding the measurements coming from a band along the boundary (this corresponds to assigning a zero weight to these measurements during the modelling).

According to another variant of execution relating to these two operating modes, the motion of the region could be computed by the adjustment of a model by using a robust estimation technique (III.2.2.1 or III.3.1.2).

The implementation of a robust estimation is within the scope of those skilled in the art, these techniques being known. Reference may also be made to the documents D5, D6 and D7 which describe techniques of this kind.

Within the context of the operating mode using two models, the motion estimation error is computed by comparing the motion coming from the regional model and from the local model at each point of the common medium according to a first alternative mode of execution (III.2.2.1 or II.3.2.1.A).

This motion estimation error may also be computed by comparing the parameters of the regional model and of the local model (III.3.2.1.B). The comparison of two models in space of parameters is known per se and can easily be implemented by those skilled in the art within the framework of this variant of execution. Reference may also be made to the document D9 which describes a comparison of this kind.

According to another alternative mode of execution, the motion estimation error is computed by comparing the regional model and the local model, by joint modelling (III.2.1.C). A modelling of this kind is known per se. Reference could be made to the article D18 referred to here above.

The error on the occluded region side enables a detection of the relative depth in step IV.

The aberrant measurements which are due to the occlusion are located around the motion boundary.

The sum of all the errors in the bands on either side of the motion boundaries is taken. Two thresholds $t_{bottom}$ and $t_{top}$ are taken to have a clear depth order. A clear order exists if the sum of the errors on one side (A) remains below $t_{bottom}$ and if the sum of the errors on the other side (B) is over $t_{top}$. In all the other cases, nothing can be said on the depth. The bottom threshold accepts a certain error on the occlusion side and the top threshold indicates the minimum error needed to consider an occluded region.

In this form, the detection is efficient only for the simplest cases. If, for example, along the contour of a region, there is only a small part where the component of the motion normal to the contour is not zero, then the thresholds will indicate that there is no well-defined order. This is due to the fact that the top threshold will not be crossed.

It is therefore planned to partition the band into several pieces or sub-bands. A voting mechanism will then be applied: only the pairs that clearly indicate a depth order will contribute to the detection of the depth.

Comparing the sum of the values obtained for each of the sub-bands with fixed thresholds then gives a more robust determination of the depth order, for only the sub-bands that meet the criteria of the thresholds will participate in the determining of the depth.

As was seen earlier, the estimation of local motion takes account of the motion within a window. If in addition the window contains a motion boundary marked by a high spatial gradient, the apparent motion will be dominated by the motion of the boundary. If we now take a point of each side of the boundary, the one belonging to the occlusion region undergoes the same motion as the boundary. It will therefore be estimated accurately, while the point in the occluded region will be poorly estimated. This is what produces a dissymmetry in the distribution of the motion estimation errors between the two sides of the motion boundaries having a high spatial gradient.

The method according to the invention takes advantage of this dissymmetry to detect the relative depth of two regions in motion with respect to each other.

The greater the contrast in luminance or chrominance between adjacent regions, the more visible is this effect.

Furthermore, the effect is strictly localized along the boundary. It is therefore important to detect it with precision, thus enabling spatial segmentation.

Finally, the method requires only two images at input as opposed to the conventional methods described further above. The motion boundaries that are considered are a subset of the set of spatial boundaries.

What is claimed is:

1. A method for the detection of the relative depth of two neighboring regions A and B in relative motion with respect to each other in two images obtained from different shots of a scene, wherein the method chiefly comprises the following steps:

obtaining a spatial segmentation of one of the images, called a reference image, obtaining a local estimation of the motion between the two images, the resultant vector field of which is called local motion, determining motion estimation errors along the motion boundaries between regions A and B, and obtaining an analysis of the localization of the motion estimation errors along the motion boundaries to conclude that a region A is in front of a region B when the motion estimation error along each boundary is chiefly localized on the region B of the boundary.

2. A method according to claim 1, wherein the motion estimation error is obtained by comparing the reference image and the image obtained by motion compensation to reconstruct an estination of the reference image from the second image.

3. A method according to claim 1, wherein the motion is the local motion.

4. A method according to claim 1, wherein the motion is derived from a model, called a local model, adjusted in a band inside the region localized along the boundary between A and B.

5. A method according to claims 1, wherein only one local model is estimated inside a band extending on either side of the boundary.

6. A method according to claim 1, wherein the motion estimation error is computed by comparing the motion derived from a model, called a regional model, representing the motion of the region and the local motion.

7. A method according to claims 1, wherein the motion estimation error is computed by a robust estimation technique.

8. A method according to claim 1 wherein, in each region, the motion error estimation is obtained by comparing the motion estimations given by two different models:

one model representing the motion of the region, called a regional model, one model representing the motion of a band inside the localized region along the frontier between A and B, called a local model.

9. A method according to claim 1, wherein only one local model is estimated inside a band extending on either side of the boundary.

10. A method according to claims 1, wherein the motion of the region is computed by the adjustment of a model in weighting the measurements as a function of their distance from the boundary between A and B.

11. A method according to claims 1, wherein the motion of the region is computed by the adjustment of a model in using a robust estimation method.

12. A method according to claim 1, wherein the motion estimation error is computed by comparing the motion derived from the regional model and that derived from the local model at each point of the common medium.

13. A method according to claim 1, wherein the motion estimation error is computed by comparing parameters of the regional model and of the local model.

14. A method according to claim 1, wherein the motion estimation error is computed by comparing the regional model and the local model by joint modelling.

15. A method according to claim 1, wherein the segmentation is done according to morphological methods.

16. A method according to claim 1, comprising a step for the fusion of the regions that have a similar motion.

17. A method according to claim 1, wherein the relative depth is obtained by comparing the sum of errors on one side of the boundary with a first fixed threshold and by comparing the sum of the errors on the other side of the boundary with a second threshold.

18. A method according to claim 1, wherein the two images are images taken successively in time, and the motion of a point will designate the shifting of this point in time when passing from one image to the other.

19. A method according claim 1, wherein the two images are taken from different angles, and the motion of a point will designate the shifting of this point in the plane of the image when passing from one image to the other.

* * * * *